Dec. 18, 1934.　　　N. G. SMITH　　　1,985,113

BUMPER SHOE

Filed May 3, 1933　　　2 Sheets-Sheet 1

Neal G. Smith, INVENTOR

BY Victor J. Evans & Co.

ATTORNEY

WITNESS:

Dec. 18, 1934.   N. G. SMITH   1,985,113
BUMPER SHOE
Filed May 3, 1933   2 Sheets-Sheet 2
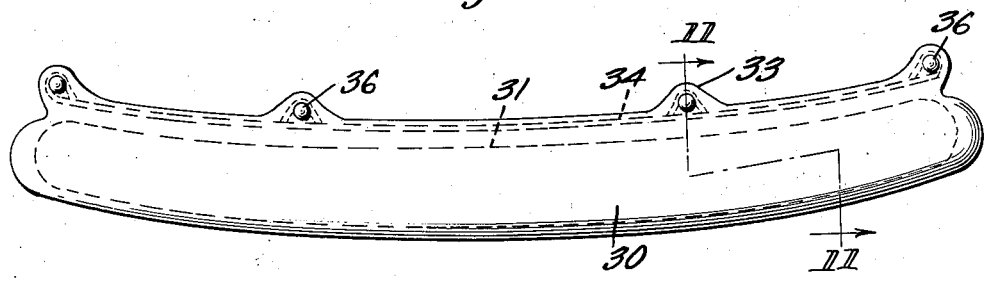
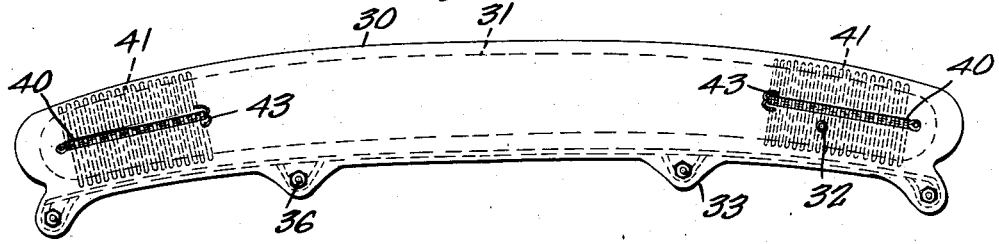
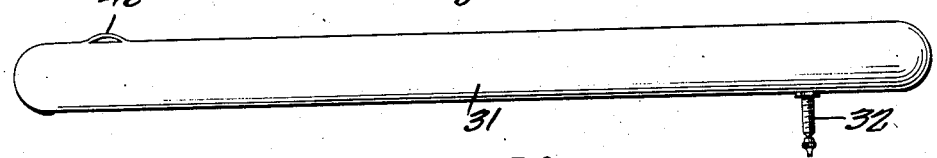
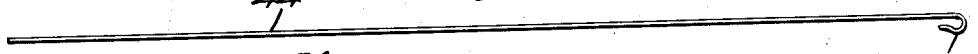
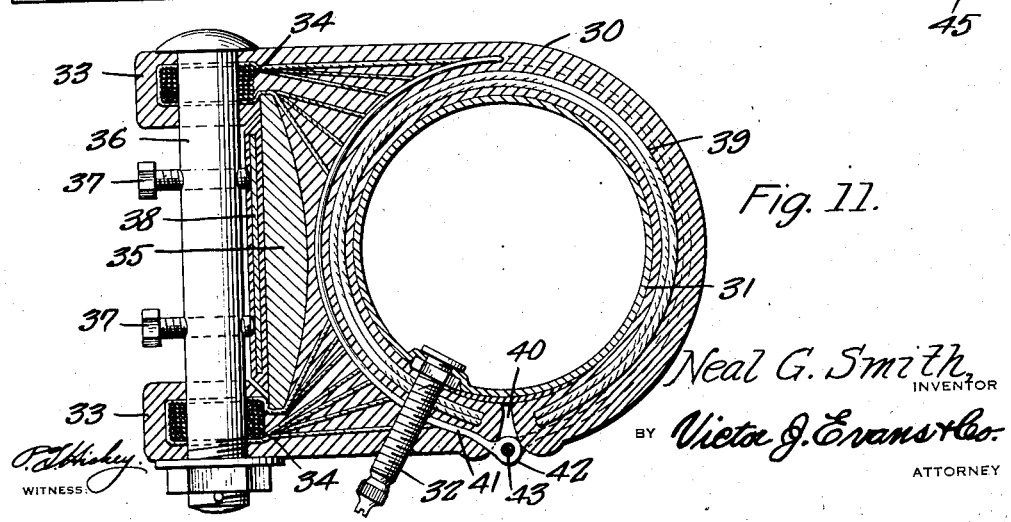
Neal G. Smith, INVENTOR
BY Victor J. Evans & Co. ATTORNEY Patented Dec. 18, 1934

1,985,113

UNITED STATES PATENT OFFICE 1,985,113

BUMPER SHOE

Neal G. Smith, Quitaque, Tex.

Application May 3, 1933, Serial No. 669,241

4 Claims. (Cl. 293—55)

The object of the invention is to provide a device for application to conventional vehicle bumpers so as to give them a resilient impact face separate and distinct from the resiliency inherent in the bumper itself; to provide a bumper shoe that may be readily applied to the bumper to which it is attached without the necessity for having to modify the latter in any particular; and generally to provide a device of the kind indicated which is of simple form when considering the functions to be performed, and comparatively inexpensive to manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claims.

In the drawings:

Figure 7 is a view similar to Figure 1 but showing a pneumatic form of the invention.

Figure 8 is a bottom plan view of the structure of Figure 7.

Figure 9 is an elevational view of the inner tube employed in the construction shown in Figure 7.

Figure 10 is a plan view of the fishing tool employed in connection with the construction shown in Figure 7.

Figure 11 is a sectional view on the plane indicated by the line 11—11 of Figure 7.

Figure 1:
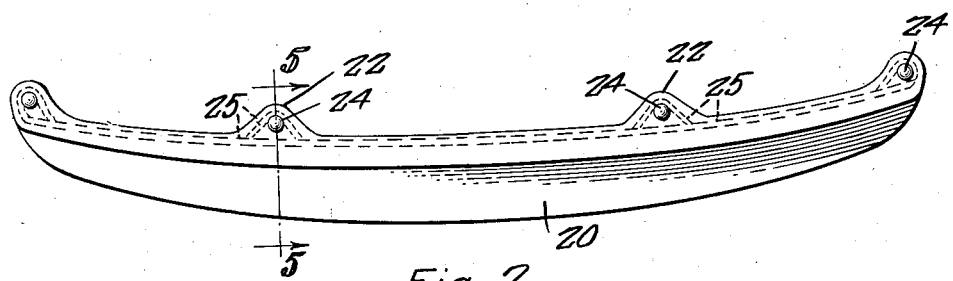
Figures 1 is a plan view of the invention.
Figure 2:
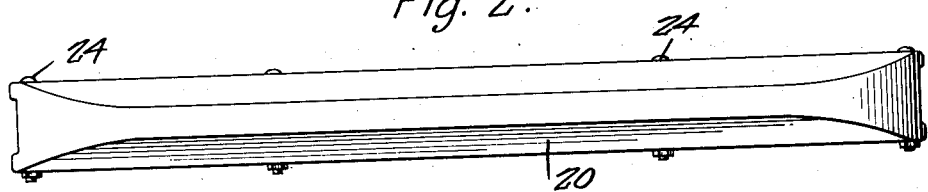
Figure 2 is a front elevational view.
Figure 3:
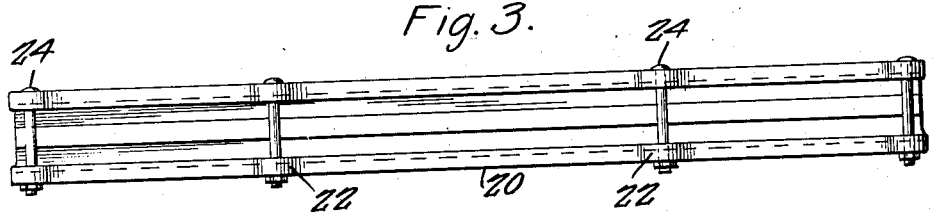
Figure 3 is a rear elevational view.
Figure 4:
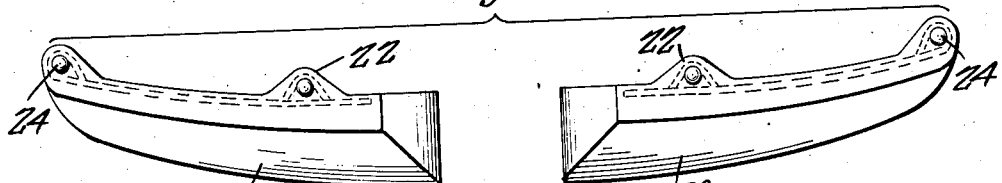
Figure 4 is a plan view of the invention modified for application to fender guards.
Figure 5:
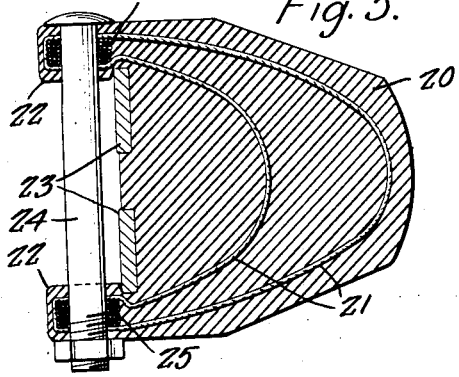
Figure 5 is a sectional view on the plane indicated by the line 5—5 of Figure 1.
Figure 6:
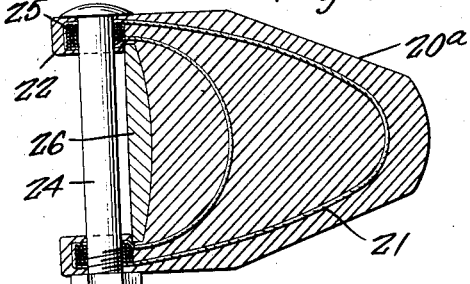
Figures 6 is a view similar to Figure 5 but showing the construction modified for use with a bumper of the single bar type as the impact element.

The shoe comprising the invention consists of a body 20, of resilient material, preferably rubber with fabric reinforcements 21 and having rearwardly extending ears 22 disposed at its upper and lower edges and in spaced relation throughout the length of the body. In the rear face, the body is channeled to receive the bars 23 constituting the impact bars of the conventional bumper, the ears extending back of these bars and the attaching bolts 24 being passed through them, so as to lie behind the bars 23.

The body 20 and ears 22 are reinforced with closely related wire strands 25 which extend throughout the length of the body in the planes of the ears and are looped around the eyes with which the ears are formed, so that the attaching bolts 24 pass through these loops when being passed through the ears.

If the bumper to which the device is to be attached is of the single bar type, the single impact bar 26 is received in the recess formed in the back of the body 20ª provided to accommodate it. The shoes formed of both the bodies 20 and 20ª are identical and are mounted on their respective bumpers in the same way, the only difference between the two bodies being that the one has the back face formed to receive the single bar 26 while the other is formed with seats for the parallel-spaced bars 23.

In that form of the invention illustrated in Figures 7 to 10, the shoe 30 is of hollow form to receive an inner tube 31, this latter being designed for air inflation with the inflating valve 32 projecting through a wall of the shoe 30 on the under side. The shoe 30 is formed with the ears 33, wire-reinforced, as indicated at 34, and these ears straddle the bumper bar 35 and receive the attaching bolts 36 which extend through them behind the bumper bar. The bolts 36 are provided with diametrical locking screws 37 which bear against the back face of the insert plate 38, the latter being seated against the rear face of the bumper bar. This construction provides for rigidly mounting the shoe on the bumper bar, so that there may be no play with its tendency for the shoe to rattle.

The body 30 is fabric-reinforced, as indicated at 39.

Access is had to the inner tube receiving space of the body by splitting the wall of the latter on the under face adjacent its opposite ends, as indicated at 40. Incorporated in the body in the zone of these splits and in surrounding relation to the inner tube receiving space are the metallic reinforcements 41, these consisting preferably of wire strands embedded in the material of the body and arranged in the form of a continuous spiral. Each convolution of the reinforcement is separated from the next convolution so that a series of overlapping eyes 42 are provided which may be arranged in intercurrent relation to receive a locking pin 43. The locking pin in the illustrated embodiment is in the form of a cotter pin and when this is inserted through the eyes, the inner tube receiving space is closed at the split. When it becomes necessary to remove the inner tube for replacement or repair, the pins 43 may be withdrawn, when the body may be opened at the splits and the inner tube drawn out. It may be replaced by the use of a fishing tool 44, the terminal hook 45 of which is engaged in a loop 46 of the inner tube. The tool then is inserted through one of the splits 40 and drawn out through the other, the inner tube being drawn into place in the shoe by such operation. After the splits have been closed by the attachment of the pins 43, the inner tube is ready for insertion with the consequent distension of the shoe.

The invention having been described, what is claimed as new and useful is:

1. In combination with a bumper having a metallic impact bar, a shoe of resilient material mounted on said bar and having spaced ears straddling said bar at its upper and lower edges, and bolts passing through said ears behind said bar, the shoe being provided with metallic reinforcing strands extending throughout its length and arranged in loops around said bolts.

2. In combination with a bumper having a metallic impact bar, a shoe of resilient material mounted on said bar and having spaced ears straddling said bar at its upper and lower edges, and bolts passing through said ears behind said bar, the shoe being provided with metallic reinforcing strands extending throughout its length and arranged in loops around said bolts, the metallic reinforcing strands consisting of bunched inner tube.

3. In combination with a bumper having a metallic impact bar, a shoe of resilient material mounted on said bar and of hollow form, and an inflatable tube disposed within said shoe, the ter being split at spaced points to provide means of access to the interior of the shoe, the shoe in the region of said splits being provided with metallic reinforcing strands embedded in the material thereof but in surrounding relation to said inner tube.

4. In combination with a bumper having a metallic impact bar, a shoe of resilient material mounted on said bar and of hollow form, and an inflatable tube disposed within said shoe, the latter being split at spaced points to provide means of access to the interior of the shoe, the shoe in the region of said splits being provided with metallic reinforcing strands embedded in the material thereof but in surrounding relation to said inner tube, the metallic reinforcing strands being arranged in the form of continuous spirals with each convolution separated from the next and formed with terminal eyes, all of said eyes being arranged in intercurrent relation, and removable pins passed through said eyes.

NEAL G. SMITH.